Oct. 31, 1944.   D. E. BADGER   2,361,811
PIPE JOINT OR COUPLING
Filed Oct. 27, 1942

Inventor
D. E. Badger
By Watson, Cole, Grindle & Watson
Attorney

Patented Oct. 31, 1944

2,361,811

UNITED STATES PATENT OFFICE 2,361,811

PIPE JOINT OR COUPLING

Dale E. Badger, Concord, N. H.; Lilla M. Badger administratrix of said Dale E. Badger, deceased Application October 27, 1942, Serial No. 463,504

6 Claims. (Cl. 285—10)

This invention relates to pipe joints or couplings and more particularly to joints of this type which are especially adaptable for use in feeding steam to rotating drier rolls, or similar installations, and withdrawing condensate therefrom.

The general object of the invention is to provide a novel and improved joint of this class which is substantially self-sealing, which requires no lubrication, and which is readily accessible for adjustment or removal of a conduit or for any other purpose.

In its preferred embodiment, the invention contemplates the provision of a steam joint for syphon and bucket type driers, for example, such as are used on paper machines, which comprises a stationary flanged fitting having a steam inlet connection and openings in opposite ends, one for the accommodation of the axially aligned nipple or coupling member carried by and rotatable with the roll or calender, and the other for the application of a novel unitary and readily removable syphon tube supporting closure.

Other features include the provision of an improved adjustable self-centering oilless bearing seal between the stationary fitting and the rotating roll connected parts, and means whereby the entire syphon, syphon support, and condensate outlet connections may be readily removed axially of the device, without dismantling the joint.

Other objects and features of novelty will be apparent from the following specification when read in connection with the accompanying drawing in which certain embodiments of the invention are illustrated by way of example.

Figure 1:
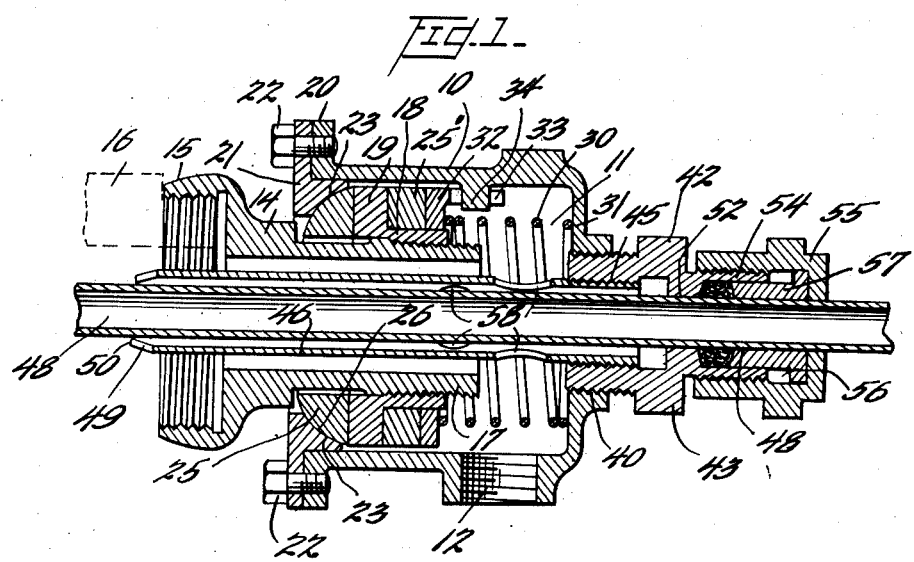
Figure 1 is a view in longitudinal section of a steam joint embodying the principles of my invention.
Figure 2:
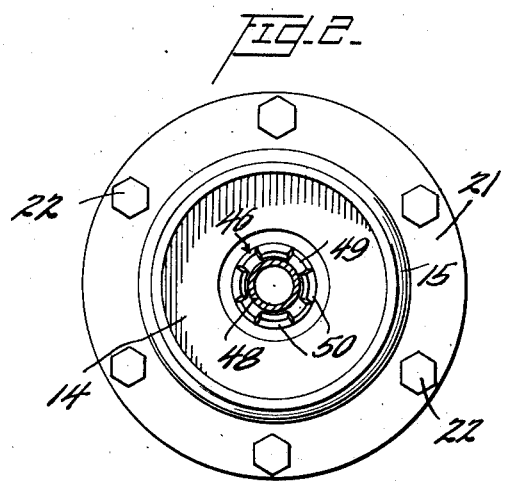
Figure 2 is an end view of the joint as seen from the left-hand side of Figure 1.

The novel steam joint is of the general type by means of which steam may be introduced into the interior of hollow drier or calender rolls, for example as used in paper making machines, and the condensate withdrawn from the rolls at the same end of the roll and through the same fitting. In Figure 1 the hollow casting 10 constitutes the stationary fitting through which the steam and condensate pass and this casing encloses a steam chamber 11 having a steam inlet opening 12 into which piping may be threaded. The casing may be supported and held in a stationary position by means of said piping or it may be provided with additional supports. The casing is open at its left-hand end for the reception of the movable part of the joint which, in this embodiment, comprises the tubular member or nipple 14 which is provided with an internally threaded bell end 15, whereby it is connected with the hub 16 of the roll so that it is rotatable therewith. The smaller end 17 of the tubular member 14 projects into the casing 10 and is externally threaded for the reception of the sleeve 18 which is provided with the flange 19. The open left-hand end of the casing 10 is flared as at 20 and an inwardly extending annular ring or removable flange 21 is secured to the portion 20 by means of bolts 22. The flange or ring 21 projects inwardly of the casing 20 and this inwardly projecting portion is preferably provided with a spherical surface 23.

Between the flange 19 on the rotatable tubular element and the flange 21 of the casing there is interposed a sealing and bearing ring 25. This ring has a plane surface contacting the flat flange 19 and a spherical surface 26 cooperating with the similar surface 23 on the flange 21. The sealing ring 25 is preferably made of carbon or a carbon or graphite containing composition which is sufficiently rigid to sustain all stresses and shocks incident to the operation of the machine and which is also of a self-lubricating nature so as to provide an efficient anti-friction bearing as well as a sealing or packing device at this point. Any steam or condensate water which may find its way to the ring will increase the anti-friction properties of the ring.

With the other portions of the casing closed or sealed off it will be apparent how the steam entering at 12 and filling all portions of the chamber 11 will render the joint self-sealing by exerting pressure which will firmly seat the rotatable tubular member 14 and the parts carried thereby against the flange 21 of the casing. However, in order to provide an initial and permanent force of some slight magnitude in order to maintain the relatively moving parts in proper seating position at all times, even when the machine is idle, there is provided a coil spring 30 which is seated at one end against the end wall 31 of the casing 10 and at the other end against the floating annular seating member 32, this member surrounding the collar 18 of the rotatable flange 19 and being provided with guide lugs as at 33 which cooperate with the boss 34 formed on the interior of the casing 10 to prevent rotation of the ring 32 with respect to the casing. The ring, however, is capable of slight longitudinal movement and is adapted to bear anti-frictionally against the ring 25' interposed between the spring seat 32 and the rotatable flange 19. This ring 25' is also suitably made of carbon or other self-lubricating material.

From the foregoing description, it will be readily apparent that there has been provided a coupling or joint which is self-sealing by the steam pressure normally contained therein, or otherwise by spring pressure, and that the joint in its preferred embodiment is self-adjusting with respect to the rotatable member to which it is applied, by virtue of the spherical sealing surfaces between the casing flange and the bearing ring 25.

A threaded opening 40 is provided in the end of the casing 10 opposite the end through which the tubular member 14 is introduced, and a plug or nut 42 is threaded into this opening. The nut 42 is provided with a squared portion 43 to which a suitable tool may be applied to install or remove this member from the casing. The nut 42 is internally threaded as at 45 to receive the threaded end of the tubular syphon tube supporting member 46. This member projects through the joint or coupling toward the roll member and is adapted to provide a cantilever member for supporting the syphon tube 48. The internal diameter of the tubular support 46 is somewhat greater than the external diameter of the tube 48 so as to provide an annular space between these members. The inner end of the support 46 is kerfed as at 49 to provide the tongues or fingers 50 which are bent radially inwardly to contact, support, and guide the syphon tube 48. The nut 42 is provided with a radially inwardly projecting flange 52 into which the tube 48 is fitted and which serves to support the tube at that point. The nut is extended outwardly by means of the annular flange 54 which is threaded to receive the stuffing box or cap 55. The head of the cap or box 55 is provided with an opening which fits snugly around the syphon tube 48 and the interior 56 of the box may be filled with any suitable packing or sealing material which may be placed under compression as by means of a follower element 57. The syphon tube support 46 is also provided with openings 58 through which the steam may circulate and from which any condensate may flow. Any suitable fittings for carrying off the condensate water may be applied to the right-hand end of the syphon tube 48 as viewed in Figure 1.

It will thus be seen that the syphon tube may be readily removed from the joint by unscrewing the nut 42 whereupon the tube, the tube support, and all connections may be removed axially from the joint without dismantling the joint or interfering with the packing or bearing devices. By this means the syphon pipe can also be tried in the joint to be sure that it does not drag and thereby be cut or broken off after a short period of use.

Figure 3:
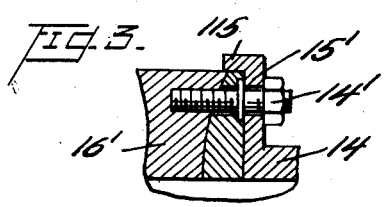
Figure 3 is a fragmentary view similar to a portion of Figure 1 but showing a modified form of roll connection.

In Figure 3 there is shown an alternative means of connecting the rotatable tubular member 14 of the coupling with the roll hub. In this figure the hub 16' is received within the annular flange 115 carried by the portion 15' of the member 14 and the bolts 14' serve to secure the roll hub 16 and the member 14 rigidly together.

It has been found that steam joints made in accordance with the present invention have functioned very efficiently and have been substantially free from leakage difficulties which have characterized much of the prior art. The joints have been found to be entirely satisfactory on machine speeds up to 1350 feet per minute or higher, and under a steam pressure in the neighborhood of 22 pounds gauge. There are no metal-to-metal wearing parts, and a long life for the joint and a great saving of the power in operating the machines to which it is applied are ensured.

It is understood that various changes and modifications may be made in the embodiments illustrated and described without departing from the scope of the invention as defined by the following claims.

Having thus described the invention, what is claimed as new and desired to be secured by Letters Patent is:

1. A flexible fluid conducting joint for providing communication with rotating bodies, such as drier rolls or the like, comprising, in combination, a tubular element carried by such body and rotatable therewith about its own axis, a stationary fitting comprising a casing having a radial inlet opening therein and oppositely disposed end openings, the tubular element being received within one of said end openings, a radially outwardly extending flange on said tubular element, a radially inwardly extending flange adjacent the last named opening in said casing and substantially radially coextensive with and embracing said first named flange, a bearing and sealing ring between said flanges providing for universal freedom of relative movement therebetween, a floating annular spring seat element within said casing axially spaced from the flange on said tubular member and adapted to partake of the movements of the flange on said tubular element, anti-friction means between said seating element and said last named flange, a spring disposed between said seating element and the wall of the casing opposite the end in which said tubular member is received, and means for withdrawing condensate through the opening in said opposite end.

2. A flexible fluid conducting joint for providing communication with rotating bodies, such as drier rolls or the like, comprising, in combination, a tubular element carried by such body and rotatable therewith about its own axis, a stationary fitting comprising a casing having a radial inlet opening therein and oppositely disposed end openings, the tubular element being received within one of said end openings, a radially outwardly extending flange on said tubular element, a radially inwardly extending flange adjacent the last named opening in said casing and substantially radially coextensive with and embracing said first named flange, a carbon bearing and sealing ring between said flanges, a floating annular spring seat element within said casing axially spaced from the flange on said tubular member, means for preventing rotation of said seating element with respect to said casing, a carbon ring between said seating element and said last named flange, a coil spring disposed between the flange on the tubular member and the wall of the casing opposite the end in which said tubular member is received, and means for withdrawing condensate through the opening in said opposite end.

3. A flexible fluid conducting joint for providing communication with rotating bodies, such as drier rolls or the like, comprising, in combination, a tubular element carried by such body and rotatable therewith about its own axis, a stationary fitting comprising a casing having a radial inlet opening therein and oppositely disposed end openings, the tubular element being received within one of said end openings, a radially outwardly extending flange on said tubular element, a radially inwardly extending flange adjacent the last named opening in said casing and substantially radially coextensive with and embracing said first named flange, means for adjusting said first named flange axially of said tubular element, a self-lubricating bearing and sealing ring between said flanges, spherical cooperating surfaces on said ring and at least one of said flanges, a coil spring disposed between the flange on the tubular member and the wall of the casing opposite the end in which said tubular member is received, and means for withdrawing condensate through the opening in said opposite end.

4. A flexible fluid conducting joint for providing communication with rotating bodies, such as drier rolls or the like, comprising, in combination, a tubular element carried by such body and rotatable therewith about its own axis, a stationary fitting comprising a casing having a radial inlet opening therein and oppositely disposed end openings, the tubular element being received within one of said end openings, an outwardly extending radial flange on said tubular element, an inwardly extending radial flange adjacent the last named opening in said casing and embracing said first named flange, a bearing and sealing ring between said flanges, a coil spring disposed between the flange on the tubular member and the wall of the casing opposite the end in which said tubular member is received, a nut threaded in the opening in said opposite end, a tubular supporting element secured to said nut and projecting inwardly through said casing, and a syphon tube passing through said supporting element and said nut, supported at spaced points by said nut and said element, and removable from the casing by the removal of said nut.

5. A flexible fluid conducting joint for providing communication with rotating bodies, such as drier rolls or the like, comprising, in combination, a tubular element carried by such body and rotatable therewith about its own axis, a stationary fitting comprising a casing having a radial inlet opening therein and oppositely disposed end openings, the tubular element being received within one of said end openings, an outwardly extending radial flange on said tubular element, an inwardly extending radial flange adjacent the last named opening in said casing and embracing said first named flange, a bearing and sealing ring between said flanges, a coil spring disposed between the flange on the tubular member and the wall of the casing opposite the end in which said tubular member is received, a nut threaded in the opening in said opposite end, a tubular supporting element secured to said nut and projecting inwardly through said casing, and a syphon tube passing through said supporting element and said nut, supported at spaced points by said nut and said element, and removable from the casing by the removal of said nut, said tubular supporting element having an internal diameter somewhat greater than the external diameter of the syphon tube passing therethrough, and kerfs forming in the free end of said element, the material between the kerfs being bent radially inwardly to form tongues contacting, centering, and supporting said tube.

6. A flexible fluid conducting joint for providing communication with rotating bodies, such as drier rolls or the like, comprising, in combination, a tubular element carried by such body and rotatable therewith about its own axis, a stationary fitting comprising a casing having a radial inlet opening therein and oppositely disposed end openings, the tubular element being received within one of said end openings, an outwardly extending radial flange on said tubular element, an inwardly extending radial flange adjacent the last named opening in said casing and embracing said first named flange, a self-lubricating bearing and sealing ring between said flanges, a coil spring disposed between the flange on the tubular member and the wall of the casing opposite the end in which said tubular member is received, a syphon tube passing through said casing and said tubular member and projecting into said rotary body, means for supporting said tube in the opening in the wall of said fitting which is opposite said rotating body, a cantilever element projecting from said fitting wall inwardly towards said body and having supporting means on its free end for contacting and supporting said syphon tube at a point spaced from its point of support in said opening.

DALE E. BADGER.